United States Patent
Gallo et al.

(10) Patent No.: US 12,264,285 B2
(45) Date of Patent: Apr. 1, 2025

(54) ENHANCEMENT OF THE BYPRODUCTS OF A REGENERATION PROCESS OF EXHAUST OILS

(71) Applicant: ITELYUM REGENERATION S.P.A., Pieve Fissiraga (IT)

(72) Inventors: Francesco Gallo, Pieve Fissiraga (IT); Cesare Oliviero Rossi, Pieve Fissiraga (IT); Victor Baldo, Pieve Fissiraga (IT); Michele Porto, Pieve Fissiraga (IT)

(73) Assignee: ITELYUM REGENERATION S.p.A., Pieve Fissirago LO (IT)

( * ) Notice: Subject to any disclaimer, the term of this patent is extended or adjusted under 35 U.S.C. 154(b) by 156 days.

(21) Appl. No.: 17/794,415

(22) PCT Filed: Jan. 15, 2021

(86) PCT No.: PCT/IB2021/050293
§ 371 (c)(1),
(2) Date: Jul. 21, 2022

(87) PCT Pub. No.: WO2021/148913
PCT Pub. Date: Jul. 29, 2021

(65) Prior Publication Data
US 2023/0069073 A1    Mar. 2, 2023

(30) Foreign Application Priority Data
Jan. 24, 2020    (IT) .................. 102020000001357

(51) Int. Cl.
C10G 31/10    (2006.01)
C08L 91/00    (2006.01)
(Continued)

(52) U.S. Cl.
CPC .............. *C10G 31/10* (2013.01); *C08L 91/00* (2013.01); *C08L 95/00* (2013.01); *C10G 31/09* (2013.01);
(Continued)

(58) Field of Classification Search
CPC ........ C10G 31/10; C10G 31/09; C10G 33/00; C10G 53/02; C08L 91/00; C08L 95/00;
(Continued)

(56) References Cited

FOREIGN PATENT DOCUMENTS

EP    3 098 291 A1    11/2016
EP    3392328 A1 * 10/2018 ...... C10M 175/0033
(Continued)

OTHER PUBLICATIONS

International Search Report, European Patent Office, Mar. 24, 2021.
(Continued)

*Primary Examiner* — Randy Boyer
*Assistant Examiner* — Juan C Valencia
(74) *Attorney, Agent, or Firm* — Bay State IP, LLC

(57) ABSTRACT

A process for the enhancement of the byproducts of a process for the regeneration of exhaust oils is described, wherein said process for the regeneration of exhaust oils which includes at least one of the following steps: a) passing of the oil to be regenerated into one or more centrifuges, b) storage of the oil, before treatment, in suitable containers, c) desiloxanation and d) filtering. The byproducts of one or more of steps a) to d) are treated, gathered and mixed with one another and added to the bitumen coming out as tail of a fractioned distillation step of the above-said regeneration process of exhaust oils.

A plant for the carrying out of a process according to any one of the preceding claims is also described, comprising a processing unit for each of the byproducts coming from steps a) to d) and a mixer (6) with stirring (7).

7 Claims, 1 Drawing Sheet

(51) Int. Cl.
*C08L 95/00* (2006.01)
*C10G 31/09* (2006.01)
*C10M 175/00* (2006.01)

(52) U.S. Cl.
CPC ..... *C08L 2207/322* (2013.01); *C08L 2555/64* (2013.01); *C10M 175/0033* (2013.01)

(58) Field of Classification Search
CPC .......... C08L 2207/322; C08L 2555/64; C10M 175/0033; C10M 175/0008; C10M 175/0016; C10M 175/005; C10M 175/00; C10M 175/0058
See application file for complete search history.

(56) References Cited

FOREIGN PATENT DOCUMENTS

| EP | 3683295 A1 * | 7/2020 | ...... C10M 175/0016 |
|----|----|----|----|
| KR | 2009 0078006 A | 7/2009 | |
| WO | 95/21902 A1 | 8/1995 | |
| WO | 02/102930 A2 | 12/2002 | |
| WO | 2019/102308 A1 | 5/2019 | |

OTHER PUBLICATIONS

Written Opinion of the International Searching Authority, European Patent Office, Mar. 24, 2021.

* cited by examiner

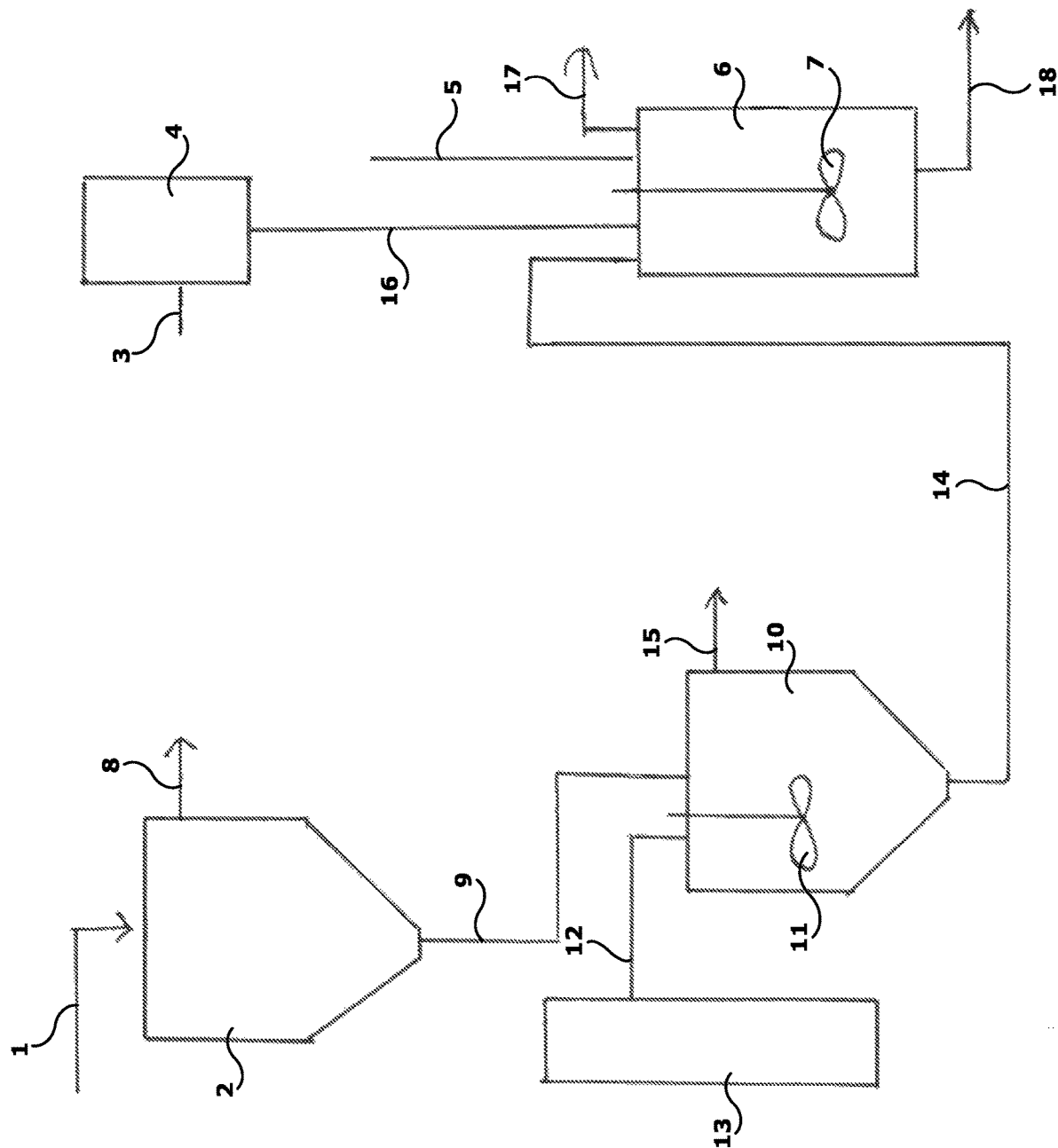

ENHANCEMENT OF THE BYPRODUCTS OF A REGENERATION PROCESS OF EXHAUST OILS

CROSS REFERENCE TO RELATED APPLICATION

This application is for entry into the U.S. National Phase from which priority is claimed under all applicable sections of Title 35 of the United States Code including, but not limited to, Sections 120, 363, and 365 (c) to International Application No. PCT/IB2021/050293 filed on Jan. 15, 2021, and which in turn claims priority under 35 USC 119 to Italian Patent Application No. 102020000001357 filed on Jan. 24, 2020.

The present invention refers to the enhancement of byproducts of a regeneration process of exhaust oils, relating to non-edible oils, wherein the process might imply passing through a desiloxanation unit.

Fluid fatty substances, commonly called oils, are frequently used in different fields. In particular, in mechanics so-called mineral oils are used, derived from petroleum, often mixtures of hydrocarbons, sometimes also of substances different therefrom. Such oils have the basic object of allowing the mutual sliding of moving mechanical parts, minimising the risk that the parts jam with one another, with resulting risks of breakage or at least of heavy damage, for example due to abrasion. For example, it is known that oil is introduced into the engine of cars to allow the correct operation thereof, avoiding seizing.

The mutual sliding of the mechanical parts implies remarkable temperature increases, often mitigated by the presence of a cooling fluid in a chamber around each mechanical part. The temperature increases may lead to cracking, condensation, dehydration reactions and others within oils, sometimes even severely altering the chemical nature thereof over time. In some cases there are even limited amounts of polymerisation, which lead to the forming of solids within the oil, which in the long run might damage the mechanical parts immersed in the oil, engraving them or cracking them.

Another problem consists of the fact that the mutual sliding of the mechanical parts leads to friction and wear thereof, removing from the usually metal mechanical parts solid particles which remain suspended in the oil, contributing to creating risks of further damage of the moving mechanical parts.

Other sources of deterioration of the oil can be expected during the use thereof such as, in some cases, also the mixing with smaller or larger amounts of water or of aqueous substances.

Over time, all that results in the oil quality continuously worsening and the moment arrives in which, in order for the equipment to efficiently survive wherein oil is used, it is necessary to proceed to the replacement thereof with fresh oil. At the end of this operation, the problem of how to dispose of the replaced oil remains, since it is a polluting substance, dangerous if ingested and which can no longer be used as such.

After a relatively long period in which the oil has been simply released into the drain, which is dangerous, given the toxicity thereof, it has been attempted to use the oil differently, to try and avoid releasing it into the environment. For such purpose, mandatory consortia have been established, bodies meant to collect exhaust oils in a differentiated manner, in order to supply the collected products to specialised companies so that they may be recovered and possibly enhanced.

In a first stage, it has been attempted to dispose of the exhaust oil by burning it. This system, still widely used, however, does not allow to use waste and the combustion is not always very simple for substances of this nature; however, moreover, it is necessary to first cause the oil to be burnt to undergo a water-removal treatment, so as to allow easy and clean combustion thereof.

Later on, various recovery processes of exhaust oils have been devised, starting from the extraction with cyclopropane or with sulphuric acid of the impurities contained due to various reasons in the oil to be recycled.

The Applicant itself has developed over time some recovery systems which follow a basic scheme, whereto different variants are applied, some of which are highly innovative, which have led to recovery processes with particularly high yields. In practice, it is started from the oils collected by the mandatory consortia, it is proceeded to alkalisation of the same, then to a flash distillation, so as to remove the water, then it is proceeded to other operations of removal of the impurities, hence to a fractioned distillation and to a hydro-refining step. Some of these processes provide further decanting and/or centrifugation steps. Other processes provide a membrane filtering step downstream of the hydro-refining. Others provide a new grinding of the fraction which should be discarded, recovering further oil and obtaining a bituminous fraction of a particularly high quality. In any case, a product of a high added value is obtained, with a considerable reduction of the release of pollutants of any kind into the environment, which is particularly desirable, since most of the exhaust oil, even today, is still disposed of incorrectly.

Another problem which has arisen, especially when hydrogen coming from biodiesel and the like was used for refining, was a rather high presence of silica, which had to be removed in order to be able to obtain a base for lubricants which met the—also legal—requirements for the marketing thereof.

Processes were thus considered which allowed to remove the sources of silica from the oils being recovered.

EP 3 392 328 discloses a process for the regeneration of exhaust oils, comprising a fractioned distillation step and a hydro-refining step, wherein the hydrogen which is fed in the refining step is hydrogen coming from biogas reforming. The recycled hydrogen following the hydro-refining then undergoes desiloxanation before being recycled to the hydro-refining reactor.

IT102017000133760, corresponding to WO2019/102 308, discloses a plant for the regeneration of exhaust oils, comprising a fractioned distillation column, fed by a flow coming from a heat exchange unit, and a hydro-refining unit of the oil fractions coming out of said fractioned distillation column. It furthermore comprises at least a desiloxanation unit, comprising a bed of alumina particles.

The drawback of this last plant is that it has alumina waste—about 300 tons a year—which must be disposed of and which is heavily soiled with siloxanes and with the oils which are run through it, as well as with the impurities thereof. It is hence a byproduct which today is devoid of uses and difficult to dispose of.

In the plants using centrifuges, which have been mentioned before, amounts of solids and of pastes collect on the walls—about 1,200 tons a year—which are also heavily polluted byproducts, difficult to dispose of.

Finally, another byproduct which collects over time and which is itself difficult to dispose of is the sludge of the tanks in which the oils to be regenerated are stored, waiting for treatment.

All these byproducts are currently not reusable and become, at the end of the work cycle, special waste, which must be disposed of according to regulatory requirements. This creates a cost which affects production costs, limiting gain for the refinery which carries out the treatments, as well as representing a waste borne by the environment.

WO02/102 930 discloses a highly energy-efficient process for processing wastes of petrol processes, using the thermal energy of fracking petrolium or from combustion ashes of solid material, said solid material absorbing the water which is formed. The product undergoes catalytic cracking.

Considerations both of an environmental and of an economic nature therefore push to find a new use for these byproducts, which makes it possible to avoid disposal thereof and to produce something which may be attractive and which may be easily marketed.

The problem at the base of the invention is to propose an enhancement method of the byproducts of a regeneration process of exhaust oils, which overcomes the mentioned drawbacks and which allows to obtain a bitumen with improved physical-chemical features and to avoid that such byproducts must be disposed of, becoming de facto special waste, with the problems associated therewith. This object is achieved through a process for the enhancement of the byproducts of a process for the regeneration of exhaust oils, wherein said process for the regeneration of exhaust oils comprises at least one of the following steps: a) passing of the oil to be regenerated through one or more centrifuges, b) storing of the oil, before treatment, in suitable containers, c) desiloxanation and d) filtering, characterised in that the byproducts of one or more of steps a) to d) are treated, gathered and mixed together, then added to the bituminous material coming out of the regeneration plant of exhaust oils. According to a second aspect, the present invention refers to a plant for carrying out the above-said process, and is characterised in that it comprises a processing unit for each of the byproducts coming from steps a) to d) and a mixer with stirring. Finally, according to a third aspect, the present invention relates to a bitumen, characterised in that it is obtained through a process according to the first aspect. The subclaims disclose preferential features of the invention.

FIG. 1 is an exemplary diagram of a regeneration process of exhaust oils that enhances the byproducts.

Further features and advantages of the invention are in any case more apparent from the following detailed description of a preferred embodiment, given purely as a non-limiting example and illustrated in the only drawing, wherein a plant capable of implementing the present invention is schematically shown.

During centrifugation, the solid sediments remain in the centrifuge and are periodically removed, to avoid clogging. The removed material is commonly stored in suitable boxes, waiting for disposal.

If it is wished to proceed to enhancement according to the present invention, instead of disposal, the removed material is fed through a pipe 1 to a decanter 2.

Should the plant provide a desiloxanation unit with alumina bed, the above-said bed, after a certain operation period, is no longer capable of significantly removing siloxanes from the flow of oil to be regenerated; for this reason, alumina must be removed from the desiloxanation unit and it usually goes to disposal, too. In the case of the process according to the present invention, the exhausted alumina is sent through a pipe 3 to a micronisation unit 4.

Finally, celite and the sludge of the storage tanks of the oils to be regenerated are fed, through a pipe 5, to a mixer 6 with shaking 7.

Decanter 2 provides an outlet 8—preferably located far away from pipe 1, so that the suspension supplied by pipe 1 does not become cloudy and pollutes with solids the waste water coming out of 8—and a drain pipe 9 which leads to a reactor-decanter 10, equipped with stirring 11 and, preferably, with a cooling device, known per se. Reactor-decanter 10 is fed, as well as by the pipe 9 coming from decanter 2, also by a pipe 12, coming from a container 13, containing quicklime, generally under nitrogen flow, to avoid undesired hydration thereof, with the risk of an excessive development of heat and of making the lime unsuitable for the aimed objects.

A pipe 14 connects reactor-decanter 10 to mixer 6, while the wastes are removed as waste water by pipe 15.

Moving on to the micronisation unit, it is connected to mixer 6 through a pipe 16.

Moving on to mixer 6 itself, it comprises two outlets, a waste water outlet 17 and a product outlet 18.

In the following, the enhancement process of the byproducts is illustrated.

If the regeneration process of exhaust oils provides a centrifugation step, the solid residue is removed in a known manner from the centrifuge and is stored. It is then sent, through pipe 1, to decanter 2. That is, any byproducts coming from step a) undergo a decanting step to reduce the water contents thereof. For such operation a supply pump is generally provided. Although "solid residue" has been mentioned, supply 1 in actual fact consists of a slurry of solid particles in oil and water and forms something between a liquid and a paste, so that it is a material which can be easily pumped. This step can be performed continuously or batch-wise. If it is a continuous supply, it will have to be relatively small with respect to the mass contained in decanter 2, while if it is operated batchwise, after supply in 2, the material will have to be left to sit for a certain length of time. In any case, the mass contained in 2 must be able to lie virtually unperturbed, so as to allow the solid material to go downwards and the liquid to rise to the surface. A certain degree of separation is thus obtained: the liquid, mostly (polluted) waste water, on the surface, is removed through pipe 8 and sent to a waste water treatment step, to then be disposed of in the sewage; the solid is instead made to go through pipe 9, to then end up in reactor-decanter 10. Simultaneously, quicklime (CaO or calcium oxide) is supplied, passing through container 13 (where it is contained, as stated, under nitrogen to prevent the quenching reaction thereof by air moisture), through pipe 12, in the same reactor-decanter 10. In practice, the solid material coming out of decanting is mixed with a heavily dehydrating substance and, preferably, said heavily dehydrating substance is Cao, easily available and cheap. The reaction is strongly exothermic and this is the reason why reactor-decanter 10 is preferably coated by a heat exchanger, of a type known per se, containing a coolant. A stirrer 11 causes the solid coming from decanter 2 and the CaO coming from container 13 to be mixed intimately, creating wide contact surfaces between the two solids, so as to greatly increase the reaction yield. In addition to the removal of any acids, the CaO reacts with the water still imbibing the solid, according to the reaction:

$$H_2O + CaO \rightarrow Ca(OH)_2$$

From the bottom of reactor-decanter 10 a solid mixture comes out containing the initial solids, coming from centrifugation, dehydrated and hydrated lime [$Ca(OH)_2$]. This mixture, through pipe 14, is transported into mixer 6. Any waste liquid is sent by pipe 15 to the waste water disposal plant, possibly after a thermal oxidation step of the substances therein contained.

In case a desiloxanation unit is present in the exhaust oil regeneration plant, comprising an alumina bed, when said alumina has been saturated, it must be removed, possibly after undergoing some regeneration cycle, in a manner known per se. Normally, such removal occurs periodically, after a certain number of regeneration cycles and/or after a usage time which compensates the opposite needs of not replacing the alumina too often and of having still sufficiently removal yields. Alternatively, it is possible to measure desiloxanation efficiency by replacing the alumina when the silica contents in the oil being regenerated exceeds a preset threshold.

In any case, the exhaust alumina is supplied, through pipe 3, to micronisation unit 4, wherein the particles are unbundled and the average size thereof is reduced. The solid, micronised alumina is transported by pipe 16 to mixer 6.

If there is a filtration unit comprising celite, it is sent directly to mixer 6 from supply 5. Supply 5 carries to mixer 6 also the sludge of the storage tanks of the oil to be treated. In practice, the byproducts coming from step b) and possibly from step c) are mixed directly with one another and with any other byproducts, treated as seen.

In mixer 6 the supplied substances are mixed by stirrer 7. Thereby the solids, coming from pipes 14, 16 and 5, are mixed with the oily material, coming from the sludge, coming from pipe 5. Pipe 17 removes any waste substances, after a thermal oxidation step, while the tail material, through pipe 18, is sent to the final use.

It has thus been discovered, in a fully surprising manner, that the material which is transported by pipe 18 can—due to simple treatments illustrated earlier—be easily and advantageously mixed with the bituminous material which comes out of the exhaust oil regeneration plant and which, unlike what was thought, contributes to remarkably improving the physical and chemical properties of the produced bitumen; only the treatments provided according to the present invention allow to obtain such a result. In particular, if this material is added to a higher-quality bitumen, for example like the one which can be obtained according to EP 3 098 291, it imparts the bitumen such properties as to make it solid or almost solid at room temperature, which is highly desirable for some processes.

It must be considered that the different supplies of this process consist of byproducts which, up until the present patent application, were not reused and were thus turned into waste upon removal from the plant. This type of waste, containing different polluting substances, was furthermore to be classified as special waste, which require burdensome storage conditions and expensive processes for the disposal thereof, in any case ending up impacting on the environment. Thereby, these byproducts, instead of becoming wate, become instead part of one of the products of these processes which are sold. On the contrary, the addition thereof to these products even increases the value thereof, making it possible to increase the gain for whoever implements the process, given that they have—fully unexpectedly—greater amounts of a product having a very likely higher unitary cost. The present invention hence makes up an excellent example of circular economy, achieving advantages both in economic and environmental terms.

It must also be taken into account that, up until today, there was no indication in the art which enabled the skilled person to understand that a process like the one just described could lead to the actually achieved result, while in actual fact it was believed that these byproducts could only negatively affect the bitumen and could hence not be mixed therewith.

However, it is understood that the invention must not be considered limited to the special arrangement illustrated above, which makes up only an examplary embodiment thereof, but that different variants are possible, all within the reach of a skilled person, without departing from the scope of protection of the invention, as defined by the following claims.

In particular, although the process and the plant have been described starting from the assumption that all the byproducts were employed, it must be clear that, remaining in the scope of the present invention, there is an enhancement even if one or more of the byproducts should lack, although probably the value of the bitumen obtained at the end can be lower than that containing all the byproducts; in any case, even in these cases the bitumen would reach a greater value than that currently on the market.

Moreover, the process subject of the present application would be implemented with alumina and/or celite of a different origin than exhaust oil regeneration.

Some actuation examples of the process according to the present invention are reported in the following.

From 1-2 tons of alumina, 1-2 tons of product obtained in 14 and from 5 tons of celite 21 tons of high-quality bitumen 5 were obtained, sold by the Applicant under the trademark Viscoflex 1000.

From 2 tons of alumina 28 tons of bitumen were obtained, sold by the Applicant under the name Itelplus 2.

From 2 tons of material transported in 14, 28 tons of bitumen were obtained, sold under the name Viscoplus 1.

Finally, from 5 tons of celite, 25 tons of bitumen were obtained, sold under the trade name Viscoplus 2.

LIST OF REFERENCES

1 Supply centrifuge residues
2 Decanter
3 Alumina supply pipe
4 Micronisation unit
5 Celite and tank sludge supply
6 Mixer
7 Stirrer (of 6)
8 Output (of 2)
9 Product drain pipe (of 2)
10 Reactor-decanter
11 Stirrer (of 10)
12. Pipe
13 Container
14 Pipe
15 Waste drain
16 Pipe
17 Waste drain
18 Product drain

The invention claimed is:

1. A process for the regeneration of exhaust oils, wherein said process for the regeneration of exhaust oils comprises at least one of the following steps: a) passing of the oil to be regenerated into one or more centrifuges, b) storage of the oil, before a treatment, in suitable containers, c) desiloxanation and d) filtering, characterised in that the by-products of one or more of the steps a) to d) are treated, gathered and mixed together with one another and added to a bituminous material exiting from the exhaust oil regeneration plant, wherein the by-products coming from step a) undergo a decanting step, to reduce the water contents thereof;

wherein, a solid material coming of decanting is mixed with a strongly dehydrating agent; and wherein the by-products coming from step b) and/or from step c) are mixed directly with one another and with any other possibly treated by-products.

2. The process as in claim 1, characterized in that said strongly dehydrating agent is Cao.

3. The process as in claim 1, characterized in that the by-products coming from step c) are micronized.

4. A plant for carrying out a process according to claim 1, characterized in that the plant comprises a processing unit for each of the byproducts coming from steps a) to d) and a mixer (6) with stirring (7).

5. The plant as in claim 4, characterized in that the plant furthermore comprises a decanter (2) for the by-products of step a).

6. The plant as in claim 5, characterised in that it furthermore comprises a reactor-decanter (10) within which, through a pipe (9), the products coming from the decanter (2) are supplied, and through a pipe (12) a strong dehydrating agent—is supplied.

7. The plant as in claim 4, characterized in that the plant comprises a micronisation unit for the by-products coming from step c).

\* \* \* \* \*